July 7, 1959    J. W. BALLARD ET AL    2,893,434
HYDRAULIC SYSTEM ACCUMULATOR MEANS
Original Filed Feb. 24, 1953

*INVENTOR.*
JAMES W. BALLARD
BY HYMAN BRIER
*Toulmin & Toulmin*
ATTORNEYS

United States Patent Office 2,893,434
Patented July 7, 1959

2,893,434

HYDRAULIC SYSTEM ACCUMULATOR MEANS

James W. Ballard, Miamisburg, and Hyman Brier, Dayton, Ohio, assignors to The Commonwealth Engineering Company of Ohio, Dayton, Ohio, a corporation of Ohio Original application February 24, 1953, Serial No. 338,382, now Patent No. 2,724,411, dated November 22, 1955. Divided and this application June 4, 1958, Serial No. 751,584

3 Claims. (Cl. 138—30)

This invention relates to devices for regulating characteristics of fluid flow and is particularly directed to structures which regulate the vibratory effects within the fluid system.

Fluid flow systems similar to electrical systems exhibit properties of resistance, capacitance and inertance (inductance). While in any given fluid flow the resistance may partially be disregarded, the capacitance and inertance effects and the relative values thereof control the period of vibrations of the fluid of the system.

Inertance is a function of such elements as orifices, valves and reducers and is susceptible of quick and accurate control only with some difficulty. The capacitive property however is readily subject to variation and affords a means of fluid control either to induce or repress vibration action in the system.

It is accordingly within the contemplation of this invention to provide novel means for the control of the characteristics of fluid flow systems, which means are actuable primarily to effect variations in the capacitance of the system.

It is also within the contemplation of this invention to provide an accumulator or surge chamber means for the control of the characteristics of a fluid system, which means are actuable to induce inductive as well as capacitative effects into the system.

The various embodiments of the invention described hereinafter incorporate a resilient deformable body which defines a chamber and is connectible into a fluid flow system; means are provided for progressively resiliently deforming this body and for securing the body in a deformed state.

The deformation action occasions a change in the volumetric capacity and accordingly the capacitance of the chamber and of the system as a whole. Thereby it becomes possible to either set up or repress the wave motion characteristics of fluid flowing in the system. For example, where a system is normally subject to flow vibrations which cause excessive and undesirable vibration effects, the introduction of the unit of invention into the system facilitates removal of the objectionable vibratory features of the system.

The change in capacitance in some of the hereinafter described embodiments is accompanied by a change in the inductive characteristics of the system and the quantitative relationship of the inductive change to the capacitance change may be controlled by selecting the tubular, resilient and deformable body in a manner which will become apparent as the description of the invention proceeds.

The foregoing objects and the structural mode of operation will become more apparent from the following detailed description and accompanying drawings wherein.

Figure 1:
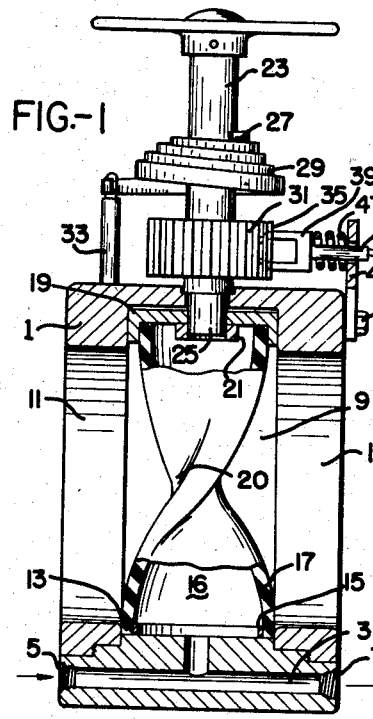
Figure 1 is a view partially in cross section illustrating one embodiment of the accumulator of invention and including a clamping structure for retaining the accumulator positioned.

Referring to Figure 1 there is shown an accumulator or surge chamber comprising a housing 1 having a fluid passage 3 and ports 5, 7 for connection to a fluid line. The housing 1 is preferably formed in two equal halves and in the assembled position thereof shown in Figure 1 the housing defines a central cavity 9 from which a series of openings 11 extend to the other side of the housing. The housing 1 is recessed at 13 and provided with a collar 15 which securely engages a lower end portion of a heavy rubber tubing 17. Tubing 17 is resiliently deformable and as shown is twisted to define a lower spacing 16 and an upper spacing 18 connected by a constricted passage 20.

A disc 19 is rotatably mounted in a recess at the upper end of cavity 9 and is provided with a depending flange 21 to which the upper end of rubber tubing or resiliently deformable body 17 is vulcanized. Body 17 may be secured to the disc 19 in any suitable manner as by rivets, etc.

A shaft 23 secured as at 25 to the disc 19 for rotation therewith, passes rotatably through the upper end of housing 1. The shaft 23 has secured thereto at 27 the end of a spiral torsion or scroll spring 29. The spring 29 is mounted above a plate 31 which is rotatable with the shaft 23; housing 1 is provided at 33 with a pin to which the other end of the spring 29 is secured.

The plate 31 is provided with ratchet teeth 35 which engage with the stop member 37. The stop member 37 comprises a fork member 39 which is mounted on a slidable shaft 41 carried in up-standing member 43. The up-standing member 43 is secured to the housing by bolts as at 45. The fork member 39 is biased towards the plate by spring 47. The shaft 41 passes through an aperture in the member 43 and the motion of the shaft is limited by stop 49.

The structural arrangement described is advantageous in that it permits the adjustment of the chamber volume to any increment within a narrow range by simply winding the spring and allowing the spring stop to come into position on one of the ratchet teeth. It is to be particularly noted that any pressure increase in the chamber can only force the ratchet teeth more rigidly against the spring stop, and accordingly the structure set out is very positive in action.

Figure 2:
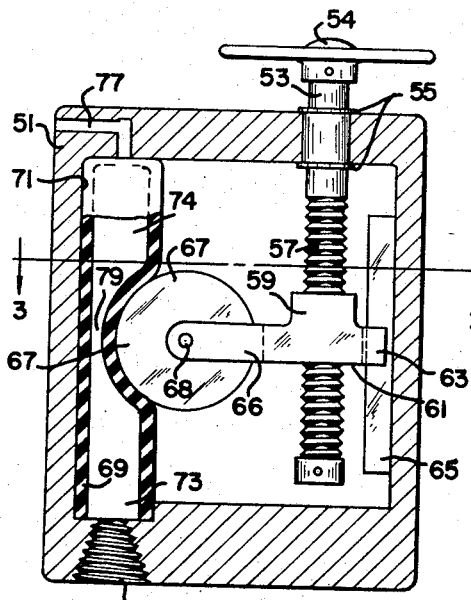
Figure 2 is a view partly in cross section illustrating a further embodiment of the accumulator of invention.
Figure 3:
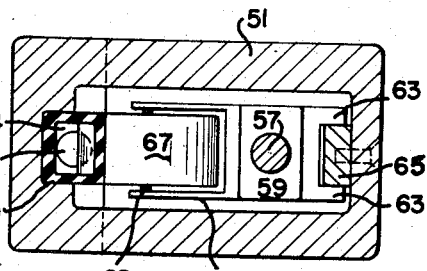
Figure 3 is a cross sectional view on line 3—3 of Figure 2.

Referring now to Figure 2 and a further embodiment of the accumulator of invention there is shown a housing 51 having a shaft 53 rotatably mounted in an upper portion thereof and fixed against rectilineal movement by collar 55 is provided with an externally screw thread 57 and passes through a nut 59 mounted on a support 61.

The support 61 at one end thereof is provided with side guides 63 which pass over a way. 65. The other end of the support 61 is provided with spaced arms 66 between which there is journaled a steel roller 67 on pin 68. The steel roller compressively engages an elongated resiliently deformable plastic tubing 69 which is fixedly secured to wall 71 of the housing 51. The tubing 69 defines an interior chamber having a lower spacing 73 and an upper spacing 74 connected by a constricted passage 79 occasioned by the pressured engagement of the roller 67 with the body 69.

The housing 51 is provided with a port 75 which opens into the spacing 73, while the upper end of the housing is provided with a passage 77 extending from the upper spacing 74 to a drain line or where desired to a return line to the system.

In the operation of the structure just described the hand wheel 54 rotates the shaft 53 in the housing 51 and causes the nut 59 and support 61 to travel over the way 65 carrying with it the roller 67. This arrangement permits the capacity of the spacings 73 and 74 and hence the characteristics of the tubing 69 to be varied.

Figure 4:
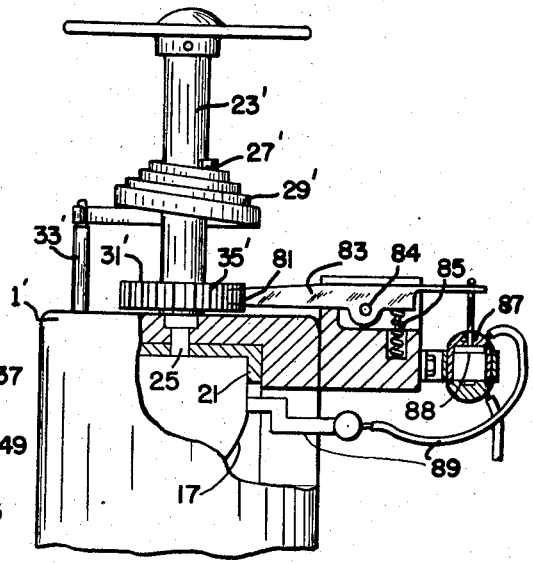
Figure 4 illustrates a further modification of the clamping structure of Figure 1.

Referring now to Figure 4 there is illustrated a modification of the clamping structure of Figure 1 and which structure is particularly useful in connection with the accumulator of Figure 1. The clamping structure of Figure 4 is similar to that of Figure 1 but incorporates a feature which permits of automatic control of the volumetric content of the chamber defined by the resiliently deformable body.

Thus in Figure 4 the same numerals are utilized as in Figure 1, but primed, and in addition there is provided a pawl 81 for engagement with the ratchet teeth, such pawl being mounted upon an arm 83 pivoted at 84 and which arm has secured thereto a spring 85 which normally causes engagement of the pawl with the ratchet teeth 35'. Thus pawl 81 serves as a stop member.

A plunger 87 having secured thereto a piston 88 contacts the arm 83 and fluid pressure passing from the system into a by-pass line 89 actuates the plunger when the pressure within the system rises unduly high; actuation of the plunger 87 causes the arm 83 and pawl 81 to move away from the ratchet 35', thus permitting the ratchet to rotate under the influence of the pressure to increase the volumetric content of the chamber. Such action further tensions the scroll spring also. When pressure in the system again falls the scroll spring rotates the shaft 23' and such action will occasion a decrease in volume of the chamber, as in Figure 1, to its original value. Pawl 81 will be brought back into engagement with the ratchet when the restoring force of the spring 85 exceeds the action of the plunger and this limits the rotation occasioned by the scroll spring.

This application is a division of application Serial No. 338,382, now Patent No. 2,724,411, granted November 22, 1955, filed February 24, 1953, and assigned to the same assignee as the present invention.

It will be understood that this invention is susceptible to modification in order to adapt it to different usages and conditions and accordingly, it is desired to comprehend such modifications within this invention as may fall within the scope of the appended claims.

We claim:

1. In combination with a variable volume accumulator actuable to produce volume variation in the accumulator by movement of a shaft in a housing supporting the accumulator, means for coupling the accumulator to a fluid line, a scroll spring secured to said shaft and housing, a ratchet on said shaft, a stop member engageable with said ratchet, and means to selectively engage and disengage said stop member in response to changes in pressure on said accumulator.

2. In combination with a variable volume accumulator actuable to produce volume variation in the accumulator by movement of a shaft in a housing supporting the accumulator, means for coupling the accumulator to a fluid line, a scroll spring secured to said shaft and housing, a ratchet on said shaft, an arm carried on the housing pivotally, a stop member engageable with said ratchet and carried at one end of said arm, a spring engageable with the other end of said arm to urge said stop member pivotally into the engaged position, and means engaging said arm actuable in response to pressure on the accumulator to overcome said spring and disengage said stop member from said ratchet.

3. In combination with a variable volume accumulator actuable to produce volume variation in the accumulator by movement of a shaft in a housing supporting the accumulator, means for coupling the accumulator to a fluid line, a scroll spring secured to said shaft and housing, a ratchet on said shaft, an arm pivotally carried on the housing, a stop member engageable with said ratchet and carried at one end of said arm, a spring engageable with the other end of said arm to urge said stop member pivotally into the engaged position, and piston means communicable with the accumulator responsive to pressure changes in said accumulator engaging said arm and actuable to overcome said spring and disengage said stop member arm.

No references cited.